2,938,048
PROCESS FOR PREPARING PHENYL PHOSPHORODICHLORIDATES

Joseph D. Odenweller, Birmingham, and Lloyd E. Goddard, Detroit, Mich., assignors to Ethyl Corporation, New York, N.Y., a corporation of Delaware No Drawing. Filed Apr. 23, 1958, Ser. No. 730,264

1 Claim. (Cl. 260—461)

This invention relates to, and has as its principal object, the preparation of phenyl phosphorodichloridates.

Phenyl phosphorodichloridates are very useful chemical intermediates in the sythesis of phenyl dimethyl phosphates. Many of the latter compounds are exceptionally effective ignition control compounds when blended in small quantity with leaded gasoline.

The preparation of aryl phosphorodichloridates has heretofore been exceedingly difficult. It has been pointed out, and the art appreciates, that reactions between phenols and phosphoryl chloride require heating, usually at reflux point, and that under these drastic conditions the restriction to monosubstitution is not very effective, even with excess phosphoryl chloride. It has thus been pointed out and shown in the prior art that the yields of monoaryl derivatives, as a rule, are decidedly short of theory.

A simple and highly efficient, low-temperature process has now been discovered which enables the preparation of phenyl phosphorodichloridates in very high yield.

Provided by this invention is a process of preparing phenyl phosphorodichloridates characterized by heating a monohydric phenol containing up to about 8 carbon atoms and up to 1 chlorine atom attached to the ring with phosphoryl chloride in a mole ratio of from 1 to about 2 moles of the chloride per mole of the phenol at a temperature of about 80 to about 110° C. in the presence of a small amount of an aluminum phenoxide catalyst.

A preferred embodiment, because of the fact that very high yields of the desired product are obtained in very short reaction times, is the process described above further characterized in that the phenol is introduced in incremental portions into a mixture of the chloride and the catalyst.

A striking feature of this invention is the exceedingly high yields of phenyl phosphorodichloridates that are achieved. Thus, even though reaction temperatures well below the reflux point are used, the difficulties referred to in the prior art are not encountered. This is significant because in the reaction under consideration, it would be expected that a mixture of phenyl phosphorodichloridates, diphenyl phosphorochloridates and triphenyl phosphates would be formed. Instead, however, restriction to mono substitution—i.e., monophosphorylation—has been accomplished to a very great extent as will be seen from the ensuing description.

Another feature of this invention is that the catalysts are basic compounds. Thus, the fact that they can be used in catalytic quantity is most unusual. This becomes apparent by noting that such compounds as sodium methoxide, aluminum isopropoxide and the like are well known basic reagents commonly employed in bimolecular nucleophylic displacement reactions with other reagents, such as alkyl halides, acyl halides, etc. When so employed, these basic compounds must be used in stoichiometric ratio with the alkyl halide, acyl halide and the like. Even though aluminum phenoxides are basic reagents of the same general type as sodium methoxide and aluminum isopropoxide, they are used in the process of this invention in catalytic quantities. Hence, the aluminum phenoxide catalysts used in this invention not only bring about surprising catalytic effects, but do so under conditions where it might be expected that much larger quantities would be necessary.

Still another feature of this invention is the fact that the basic catalysts that are used—i.e., the aluminum phenoxides—exert a profound catalytic effect upon the reaction in question, whereas many acidic compounds, such as the highly acidic protonated acids—trichloroacetic and p-toluene sulfonic acids—fail to exert any catalytic effect whatsoever.

Another advantage springing from the use of aluminum phenoxide catalysts is the fact that these materials are easily prepared and are very easy to work with.

The following examples illustrate this invention. All parts and percentages are by weight.

Example I 0.47 part of aluminum turnings was added in incremental portions to 119 parts of a commercially-available grade of cresylic acid at 195 to 200° C. After the evolution of hydrogen ceased, this mixture was allowed to cool and then fed slowly over a period of one hour to 306 parts of phosphoryl chloride at 90 to 100° C. After a short induction time, the reaction initiated and proceeded smoothly to completion. The reaction product was stripped up to 150° C. at 50 millimeters of mercury pressure. Recovered was 214.1 parts of phosphorylated product which, when subjected to chemical analysis, was found to contain 84.8 percent of tolyl phosphorodichloridates (mixed tolyl isomers).

Examples II–III

The procedure of Example I is repeated using in one instance phenol and in another instance chloroxylenol instead of cresylic acid. In the first instance, the product contains a very high percentage of phenyl phosphorodichloridate. In the second instance, the product is predominately chloroxylyl phosphorodichloridate.

Example IV

Into a reaction vessel are charged 306.7 parts of phosphoryl chloride and 4.4 parts of the aluminum salt of xylenol prepared by heating 0.3 part of aluminum chips to 230° C. with 4.1 parts of xylenol. While holding the temperature of this mixture at 110° C., 122 parts of xylenol is added over a one hour period. The reaction is initiated practically instantaneously and proceeds smoothly to completion. Fractionation of the resultant product provides a high yield of xylyl phosphorodichloridate.

Example V

The catalyst is prepared by heating 0.14 part of aluminum turnings with 0.6 part of m-cresol to a temperature of 150° C. Added to this catalyst is 306.7 parts of phosphoryl chloride. While holding the temperature of this mixture at 80° C., 108 parts of m-cresol is introduced into the reaction vessel over a 0.75-hour period. The reaction commences as soon as the m-cresol feed is begun and the reaction proceeds smoothly to completion. Rectification of the resultant reaction mixture provides a high yield of m-tolyl phosphorodichloridate.

Examples IV and V demonstrate a preferred manner by which the process of this invention is conducted. Not only are the yields of product very high, but the feed of the phenolic compound into the catalyst-phosphoryl chloride mixture produces no lag period between the time at which the feed is commenced and the time reaction proceeds.

As shown by the above examples, the process of this invention utilizes with great success monohydric phenols containing up to about 8 carbon atoms and up to 1 chlorine atom attached to the ring. Illustrative of these are phenol, o-, m-, and p-cresol, the various xylenols, and the ring monochlorinated derivatives of these phenolic compounds. Commercially available mixtures of these phenolic compounds or mixtures of unchlorinated and monochlorinated phenols can also be used.

Instead of phosphoryl chloride, recourse may be had to phosphoryl bromide, phosphoryl iodide, phosphoryl bromochlorides or mixtures of these materials. Phosphoryl chloride is preferred because of its high reactivity, availability and relatively low cost.

It is preferable to conduct the process of this invention under substantially anhydrous conditions. However, even if water is introduced inadvertently into the reaction system—e.g., by means of a poor grade of phenol—the reaction will proceed very readily provided additional catalyst is used. However, this is undesirable because of the additional operation required and the consequent increase in cost. On the other hand, the process of this invention proceeds very readily when using commercially-available reactants of normal purity.

The process of this invention proceeds very readily at temperatures ranging from 80 to 110° C. With most of the above phenolic compounds, the ideal temperatures are from 90 to 100° C.

Catalytic quantities of aluminum phenoxide are used in the process of this invention. Generally speaking, there should be present from about 0.25 to about 5 percent by weight of aluminum as an aluminum phenoxide based on the weight of the phenol used.

When preparing pure phenyl phosphorodichloridates, the catalyst should be prepared from the same phenolic compound that is being used to react with the phosphoryl chloride. By so doing, ester interchange reactions are avoided. However, when making mixtures of various phenyl phosphorodichloridates, the catalyst can be made from any of the foregoing phenolic compounds.

The following example illustrates a preferred manner by which a typical phenyl phosphorodichloridate is used as a chemical intermediate in the synthesis of a phenyl dimethyl phosphate.

*Example VI*

One-half mole (112.5 parts) of distilled m-tolyl phosphorodichloridate prepared by the procedure of Example V is fed over 50 minutes at 20° C. to 96 parts (3 moles) of methanol with constant stirring and external cooling. After cooking the reaction mixture for 75 minutes at 30° C., the reaction product is quenched in 300 parts of water, neutralized with 55 parts of a 10 percent sodium hydroxide-10 percent sodium chloride solution, washed twice with 50-part quantities of 5 percent sodium chloride solution, dried under reduced pressure, filtered and weighed. Distillation of the organic product yields very pure m-tolyl diphenyl phosphate which comes off at 114° C. at one millimeter of mercury pressure. Analysis of this phosphate shows it to correspond very closely to the theoretical values of 50.0 percent of carbon, 6.02 percent of hydrogen and 14.35 percent of phosphorus. It has a refractive index of $n_D^{20}$ 1.4910.

The pre-eminence of the phenyl dimethyl phosphates as ignition control compounds was demonstrated by carrying out a series of fleet tests. Used were various modern automobiles equipped with 11:1 compression ratio engines. The cars were operated under standard driving conditions on a commercially-available gasoline containing 3 milliliters of tetraethyllead per gallon as standard Motor Mix (0.5 theory of bromine as ethylene dibromide and 1.0 theory of chlorine as ethylene dichloride) with which had been blended 1.04 milliliters per gallon of a mixture of tolyl dimethyl phosphate and xylyl dimethyl phosphate (mixed isomers in each instance). It was found that the spark plug life when using this treated fuel as measured by miles required to reach three spark plug failures per car was ten times as long as the spark plug life afforded by the same tests using the corresponding phosphate-free leaded gasoline.

What is claimed is:

A process for preparing phenyl phosphorodichloridates comprising heating (A) mols of a monohydric phenol containing up to about 8 carbon atoms and up to one chlorine atom attached to the ring with a small quantity of aluminum at a temperature of at least 150° C., and adding the reaction mixture in incremental portions to (B) mols of phosphoryl chloride maintained at a temperature between about 90 to 100° C., the ratio of (A) to (B) varying between about 1:1 to about 1:2.

References Cited in the file of this patent

UNITED STATES PATENTS

| 2,225,285 | Moyle | Dec. 17, 1940 |

FOREIGN PATENTS

| 573,083 | Great Britain | Nov. 6, 1945 |
| 651,656 | Great Britain | Apr. 4, 1951 |